United States Patent
Yu et al.

(10) Patent No.: US 12,208,552 B2
(45) Date of Patent: Jan. 28, 2025

(54) ARTIFICIAL INTELLIGENCE-BASED INJECTION MOLDING SYSTEM AND METHOD FOR GENERATING MOLDING CONDITION IN INJECTION MOLDING SYSTEM

(71) Applicant: LS MTRON LTD., Anyang-si (KR)

(72) Inventors: Hyeon Jae Yu, Anyang-si (KR); Kyong Ho Park, Anyang-si (KR); Salov Andrey, Gyeonggi-do (JP); Seung Chul Lee, Anyang-si (KR); Chi Hun Lee, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 420 days.

(21) Appl. No.: 17/641,596

(22) PCT Filed: Sep. 8, 2020

(86) PCT No.: PCT/KR2020/012107
§ 371 (c)(1),
(2) Date: Mar. 9, 2022

(87) PCT Pub. No.: WO2021/049848
PCT Pub. Date: Mar. 18, 2021

(65) Prior Publication Data
US 2022/0297362 A1     Sep. 22, 2022

(30) Foreign Application Priority Data

Sep. 11, 2019 (KR) .......................... 10-2019-0113137
Aug. 21, 2020 (KR) .......................... 10-2020-0105270

(51) Int. Cl.
*B29C 45/76*     (2006.01)
*G05B 13/02*    (2006.01)

(52) U.S. Cl.
CPC ........ *B29C 45/766* (2013.01); *B29C 45/7686* (2013.01); *G05B 13/0265* (2013.01);
(Continued)

(58) Field of Classification Search
CPC .............. B29C 45/766; B29C 45/7686; B29C 2945/7613; B29C 2945/7629;
(Continued)

(56) References Cited

U.S. PATENT DOCUMENTS

2006/0082009 A1* 4/2006 Quail .................... B29C 45/766
 700/200
2006/0224540 A1* 10/2006 Shioiri .................. B29C 45/766
 706/23

(Continued)

FOREIGN PATENT DOCUMENTS

| CN | 105228808 A | 1/2016 |
| EP | 0990966 A2 | 4/2000 |

(Continued)

OTHER PUBLICATIONS

Search Report for related Chinese Application No. 2020800628993; action dated Oct. 26, 2023; (2 pages).

(Continued)

*Primary Examiner* — Kidest Bahta
(74) *Attorney, Agent, or Firm* — K&L Gates LLP

(57) ABSTRACT

An artificial intelligence-based injection molding system comprising a standard data extraction unit for extracting target standard data of a product produced by a mold from mold information about the mold to which a molding material is supplied; a molding condition output unit inputting the extracted target standard data into a pre-learned molding condition generation model to output a molding condition; an injection molding device, supplying the molding material to the mold according to the molding condition (Continued)

to produce the product; and a determination unit, comparing production standard data of the produced product and the target standard data to determine whether the molding condition is appropriate, wherein, if the determination unit determines that the molding condition is inappropriate, the molding condition output unit generates the production standard data and the molding condition as one set of feedback data, and trains the molding condition generation model with the set of feedback data.

10 Claims, 5 Drawing Sheets

(52) U.S. Cl.
CPC ................. *B29C 2945/7613* (2013.01); *B29C 2945/7629* (2013.01); *B29C 2945/76464* (2013.01)

(58) Field of Classification Search
CPC .... B29C 2945/76464; B29C 2945/761; B29C 2945/76949; B29C 2945/76979; G05B 13/0265; G06N 3/088
See application file for complete search history.

(56) References Cited

U.S. PATENT DOCUMENTS

| | | | |
|---|---|---|---|
| 2017/0031330 A1* | 2/2017 | Shiraishi | G06N 7/01 |
| 2017/0129187 A1* | 5/2017 | Hashimoto | B29C 64/153 |
| 2018/0178430 A1* | 6/2018 | Stoehr | G06F 30/20 |

FOREIGN PATENT DOCUMENTS

| | | |
|---|---|---|
| JP | 63209918 A | 8/1988 |
| JP | H0477219 A | 3/1992 |
| JP | H04209004 A | 7/1992 |
| JP | 2000258151 A | 9/2000 |
| JP | 2006289874 A | 10/2006 |
| JP | 2007313852 A | 12/2007 |
| JP | 2017030152 A | 2/2017 |
| JP | 2019014187 A | 1/2019 |
| JP | 2019119172 A | 7/2019 |
| KR | 20170101607 A | 9/2017 |
| KR | 20180116610 A | 10/2018 |
| KR | 20190022258 A | 3/2019 |
| KR | 20190065834 A | 6/2019 |

OTHER PUBLICATIONS

Supplemental Search Report for related European Application No. 20862082.3; action dated Sep. 4, 2023; (7 pages).
Ivester, et al; "Automatic Tuning and Regulation of Injection molding by the Virtual Search Method"; Transations of the American Society of Mechanical Engineers, Series B; Journal of Engineering for Industry; vol. 120, No. 2; May 1, 1998; (7 pages).
Office Action for related Japanese Application No. 2022-514961; action dated Dec. 13, 2022; (3 pages).
Office Action for related Japanese Application No. 2022-514961; action dated May 16, 2023; (3 pages).
International Search Report for related International Application No. PCT/KR2020/012107; action dated Mar. 18, 2021; (5 pages).
Tercan, et al; "Transfer-Learning: Bridging the Gap Between Real and Simulation Data for Machine Learning in Injection Molding"; ScienceDirect; 2018: (6 pages).
Office Action for related Chinese Application No. 202080062899.3 and corresponding English language machine translation by Google; action dated Oct. 30, 2023; (10 pages).
Search Report for related Chinese Application No. 2020800628993 corresponding English language machine translation by Google; action dated Oct. 26, 2023; (4 pages).

* cited by examiner

ARTIFICIAL INTELLIGENCE-BASED INJECTION MOLDING SYSTEM AND METHOD FOR GENERATING MOLDING CONDITION IN INJECTION MOLDING SYSTEM

CROSS-REFERENCE TO RELATED APPLICATIONS

The present application is a National Stage of International Application No. PCT/KR2020/012107 filed on Sep. 8, 2020, which claims the benefit of Korean Patent Application No. 10-2019-0113137, filed on Sep. 11, 2019; and Korean Patent Application No. 10-2020-0105270, filed on Aug. 21, 2020 with the Korean Intellectual Property Office, the entire contents of each hereby incorporated by reference.

FIELD

The present disclosure relates to an injection molding system.

BACKGROUND

Injection molding is a manufacturing method that is most widely used in manufacturing plastic products. For example, in products including televisions, portable phones, personal digital assistants (PDAs), etc., various parts including covers and cases may be manufactured through injection molding.

In general, product manufacturing through injection molding is performed through the following processes. First, a molding material containing a pigment, a stabilizer, a plasticizer, a filler, etc. is put into a hopper to make the molding material molten. Subsequently, the molding material in a melted state is injected into a mold and then solidified by cooling.

Subsequently, the solidified molding material is extracted from the mold, and then unnecessary portions are removed. Through these processes, various types of products having various sizes are manufactured.

As equipment for performing such injection molding, an injection molding machine is used. The injection molding machine includes an injection device that supplies a molding material in a melted state and a shaping device that solidifies the molding material in the melted state by cooling.

To manufacture a product through an injection molding machine, a person should personally set various variables, such as temperature, speed, pressure, time, etc. For this reason, corresponding sites are highly dependent on experts. Even when an expert sets various variables, there are problems in that a process condition greatly varies depending on who performs the setting, and the quality of products is not constant.

To solve these problems, a simulation technique was proposed. However, the simulation technique has a problem in that it takes about 30 minutes to 2 hours in a general computation environment, which is a long time, and a problem in that it is not possible to accurately simulate an actual experiment, which leads to low accuracy.

SUMMARY

To solve the above-described problems, the present disclosure is directed to providing an artificial intelligence (AI)-based injection molding system capable of providing a molding condition with high accuracy in a short time and a molding condition generation method in the injection molding system.

The present disclosure is also directed to providing an AI-based injection molding system capable of generating a molding condition using a deep-learning-based molding condition generation model and a molding condition generation method in the injection molding system.

The present disclosure is also directed to providing an AI-based injection molding system capable of providing an optimal molding condition by additionally learning a molding condition which is incorrectly output from a molding condition generation model and a molding condition generation method in the injection molding system.

Technical Solution

One aspect of the present disclosure provides an artificial intelligence (AI)-based injection molding system including: a standard data extraction unit 210 configured to extract target standard data of a product, which is manufactured through a mold, from mold information of the mold to which a first molding material in a melted state is supplied; a molding condition output unit 220 configured to input the extracted target standard data into a pre-trained molding condition generation model 230 and output a molding condition; an injection molding machine 100 configured to supply the first molding material to the mold under the molding condition and manufacture the product; and a determination unit 250 configured to compare manufacturing standard data of the manufactured product with the target standard data and determine whether the molding condition is appropriate. When the determination unit 250 determines that the molding condition is inappropriate, the molding condition output unit 220 generates one feedback dataset from the manufacturing standard data and the molding condition and trains the molding condition generation model 230 with the feedback dataset.

Another aspect of the present disclosure provides a molding condition generation method in an AI-based injection molding system, the molding condition generation method including: extracting target standard data, which is a standard of a product, from mold information of a mold to which a molding material in a melted state is supplied; inputting the extracted target standard data into a pre-trained molding condition generation model to output a molding condition; supplying the molding material to the mold under the molding condition to manufacture the product; measuring manufacturing standard data of the manufactured product; comparing the measured manufacturing standard data with the target standard data to determine whether the molding condition is appropriate; and when it is determined that the molding condition is inappropriate, training the molding condition generation model using the inappropriate molding condition and the manufacturing standard data as one feedback dataset.

According to the present disclosure, it is possible to provide a molding condition with high accuracy in a short time even without a skilled expert.

According to the present disclosure, it is possible to ensure the performance of a molding condition generation model because a molding condition can be generated using a deep-learning-based molding condition generation model.

According to the present disclosure, a molding condition generation model can be gradually improved in performance by additionally learning a molding condition which is incorrectly output from the molding condition generation model such that an optimal molding condition can be generated.

DETAILED DESCRIPTION

Hereinafter, embodiments of the present disclosure will be described in detail with reference to the accompanying drawings.

Figure 1:
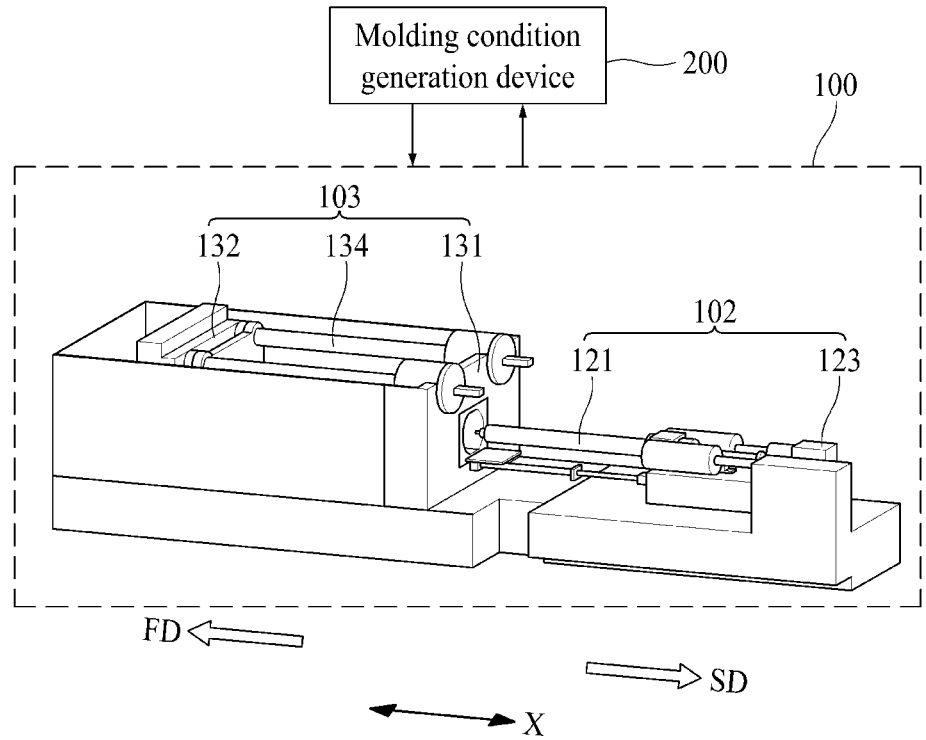
FIG. 1 is a diagram of an artificial intelligence (AI)-based injection molding system according to an embodiment of the present disclosure.

FIG. 1 is a diagram of an artificial intelligence (AI)-based injection molding system according to an embodiment of the present disclosure.

An AI-based injection molding system 10 (hereinafter "injection molding system") according to the present disclosure manufactures a product using a molding material according to an optimal molding condition. To this end, as shown in FIG. 1, the injection molding system 10 includes an injection molding machine 100 and a molding condition generation device 200.

Figure 2:
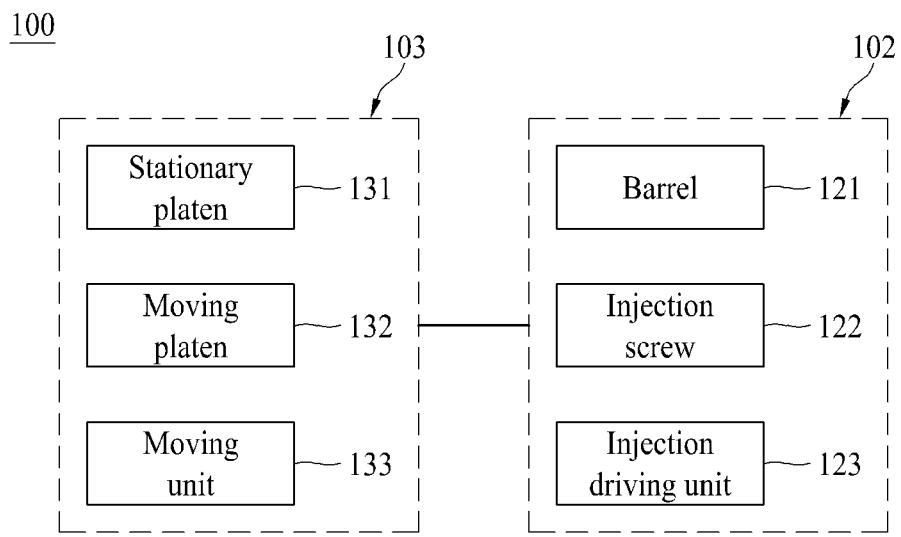
FIG. 2 is a diagram showing a configuration of an injection molding machine according to an embodiment of the present disclosure.

FIG. 2 is a diagram showing a configuration of the injection molding machine 100 according to an embodiment of the present disclosure. Referring to FIGS. 1 and 2, the injection molding machine 100 will be described in detail.

As shown in FIGS. 1 and 2, the injection molding machine 100 according to the present disclosure includes an injection device 102 and a shaping device 103.

The injection device 102 supplies a molding material in a melted state to the shaping device 103. The injection device 102 may include a barrel 121, an injection screw 122 disposed in the barrel 121, and an injection driving unit 123 for driving the injection screw 122. The barrel 121 may be disposed in parallel with a first axis direction (X-axis direction). The first axis direction (X-axis direction) may be a direction parallel to a direction in which the injection device 102 and the shaping device 103 are spaced apart from each other. When a molding material is supplied into the barrel 121, the injection driving unit 123 may move the molding material supplied into the barrel 121 in a first direction (FD arrow direction) by rotating the injection screw 122. In this process, the molding material may be melted by friction and heating. The first direction (FD arrow direction) may be a direction from the injection device 102 toward the shaping device 103 and may be a direction parallel to the first axis direction (X-axis direction). When the molding material in the melted state is in the first direction (FD arrow direction) from the injection screw 122, the injection driving unit 123 may move the injection screw 122 in the first direction (FD arrow direction). Accordingly, the molding material in the melted state may be supplied from the barrel 121 to the shaping device 103.

The shaping device 103 solidifies the molding material in the melted state by cooling. The shaping device 103 may include a stationary platen 131 to which a fixed mold 150 is coupled, a moving platen 132 to which a moving mold 160 is coupled, and a moving unit 133 that moves the moving platen 132 in the first axis direction (X-axis direction).

Figure 3:
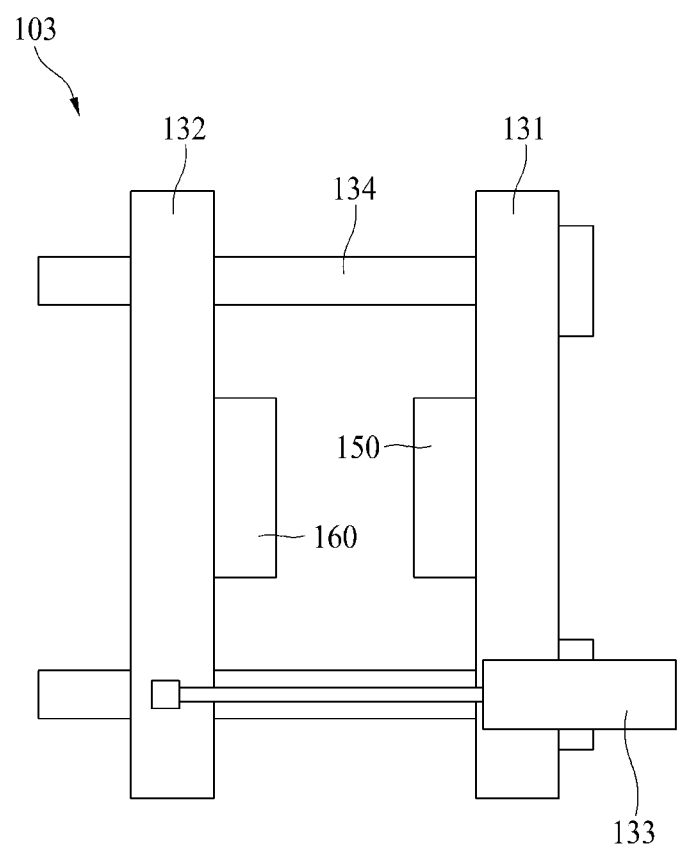
FIG. 3 is a diagram showing a fixed mold and a moving mold that are open.
Figure 4:
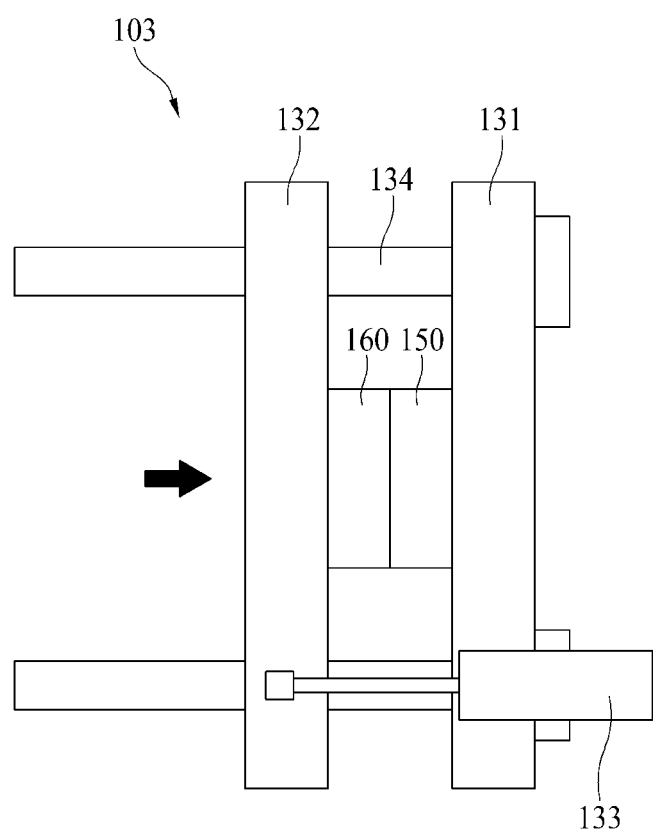
FIG. 4 is a diagram showing the fixed mold and the moving mold that are closed by a moving unit.

FIGS. 3 and 4 are diagrams illustrating an operation of the moving unit closing the fixed mold and the moving mold.

When the moving unit 133 closes the moving mold 160 and the fixed mold 150 by moving the moving platen 132 in a second direction (SD arrow direction), the injection device 102 supplies a molding material in a melted state into the moving mold 160 and the fixed mold 150. The second direction (SD arrow direction) is a direction that is parallel to the first axis direction (X-axis direction) and opposite to the first direction (FD arrow direction). Subsequently, when the shaping device 103 solidifies the molding material in the melted state, with which the moving mold 160 and the fixed mold 150 are filled, by cooling, the moving unit 133 opens the moving mold 160 and the fixed mold 150 by moving the moving platen 132 in the first direction (FD arrow direction).

The shaping device 103 may include a tie bar 134. The tie bar 134 guides movement of the moving platen 132. The moving platen 132 may be movably coupled to the tie bar 134. The moving platen 132 may move in the first axis direction (X-axis direction) along the tie bar 134. The tie bar 134 may be disposed in parallel with the first axis direction (X-axis direction). The tie bar 134 may be inserted into and coupled to each of the stationary platen 131 and the moving platen 132.

Meanwhile, the injection molding machine 100 according to the present disclosure manufactures a product by supplying a molding material to the closed moving mold 160 and fixed mold 150 according to a molding condition generated by the molding condition generation device 200. The moving mold 160 and the fixed mold 150 are referred to below as the "mold."

The molding condition generation device 200 generates and transmits a molding condition to the injection molding machine 100. To generate an optimal molding condition, the molding condition generation device 200 determines whether the molding condition is appropriate based on a product manufactured under the molding condition.

The molding condition generation device 200 according to the present disclosure will be described in further detail below with reference to FIG. 5.

Figure 5:
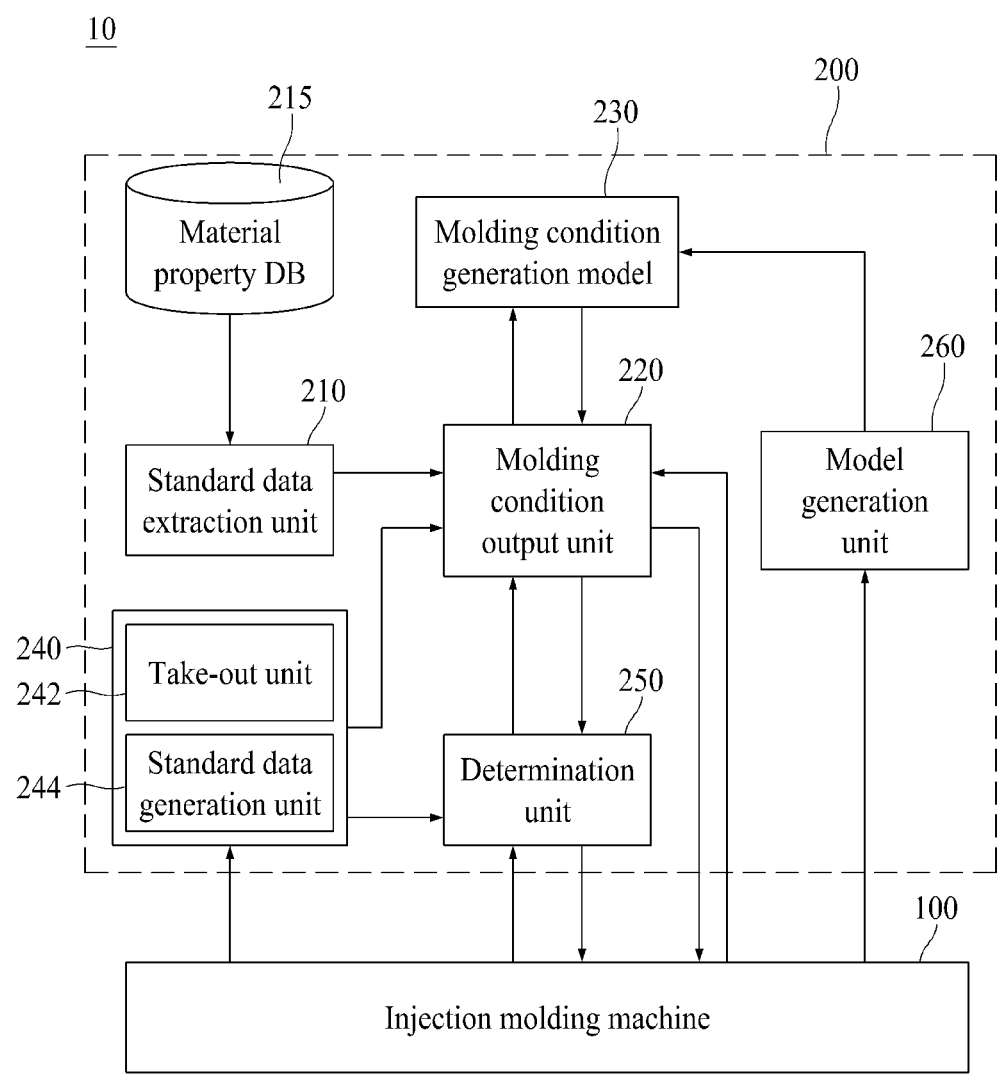
FIG. 5 is a diagram illustrating a configuration of a molding condition generation device according to an embodiment of the present disclosure.

FIG. 5 is a diagram illustrating a configuration of the molding condition generation device 200 according to an embodiment of the present disclosure. As shown in FIG. 5, the molding condition generation device 200 includes a standard data extraction unit 210, a molding condition output unit 220, a molding condition generation model 230, and a determination unit 250.

The standard data extraction unit 210 extracts target standard data, which is the standard of a product, from mold information. Specifically, the standard data extraction unit 210 extracts target standard data of a product, which is manufactured through a mold, from mold information of the mold to which a first molding material in a melted state is supplied. Here, the first molding material is a molding material used in the product to be manufactured.

According to an embodiment, the standard data includes at least one of shape information and weight information of the product.

According to an embodiment, the shape information may include at least one of a total volume of the product manufactured through the mold, the volume of cavities of the mold, the number of cavities, the number of gates of the mold, a surface area of the product, a surface area of the cavities, a first projected area XY of the product, a second projected area YZ of the product, a third projected area ZX of the product, a maximum thickness of the product, an average thickness of the product, a standard deviation of a thickness of the product, a diameter of the gates, a maximum flow distance from the gates to an end of the product, and a ratio of the average thickness of the product to the maximum flow distance.

The first to third projected areas are areas of the product vertically projected on axial planes XY, YZ, and ZX, respectively. Also, the diameter of the gate is a circular diameter or a hydraulic diameter.

According to an embodiment, the standard data extraction unit 210 may generate mold information by scanning the mold for manufacturing the product and extract shape information of the product from the mold information. Unlike this embodiment, the standard data extraction unit 210 may generate mold information by receiving a mold drawing of the product and extract shape information of the product from the mold information.

According to an embodiment, the standard data extraction unit 210 extracts a solid density of the first molding material among a plurality of molding materials from a material property database 215. Then, the standard data extraction unit 210 may extract a weight of the product using the extracted solid density of the first molding material and the total volume of the product.

In the material property database 215, solid densities of a plurality of molding materials are stored. Although the molding condition generation device 200 is shown to include the material property database 215 in FIG. 5 for convenience of description, this is only one example, and the material property database 215 may be configured as a separate component from the molding condition generation device 200.

The molding condition output unit 220 inputs the target standard data extracted by the standard data extraction unit 210 into the molding condition generation model 230 trained in advance and outputs a molding condition. According to an embodiment, the molding condition may include at least one of a temperature of the mold, a temperature of the barrel 121, an injection speed of the injection molding machine 100, a packing time of the injection molding machine 100, and a packing pressure of the injection molding machine 100.

The molding condition output unit 220 transmits the output molding condition to the injection molding machine 100. Accordingly, the injection molding machine 100 supplies the first molding material to the mold under the molding condition and manufactures the product.

According to an embodiment, when it is determined that the molding condition is inappropriate as a result of manufacturing the product under the output molding condition, the molding condition output unit 220 generates one feedback dataset from manufacturing standard data of the product manufactured under the inappropriate molding condition and the molding condition. Then, the molding condition output unit 220 trains the molding condition generation model 230 with the feedback dataset.

According to an embodiment, in training the molding condition generation model 230, the molding condition output unit 220 may perform transfer learning with the feedback dataset.

When training of the molding condition generation model 230 with the feedback dataset is completed, the molding condition output unit 220 may input the target standard data to the molding condition generation model 230 to output a modified molding condition.

As described above, according to the present disclosure, one dataset is generated from an inappropriate molding condition and manufacturing standard data of a product manufactured under the inappropriate molding condition to train the molding condition generation model 230 such that performance of the molding condition generation model 230 can be gradually improved. Accordingly, an optimized molding condition can be automatically found, and thus it is possible to manufacture a product with the best quality even without a skilled expert.

When the target standard data is input through the molding condition output unit 220, the molding condition generation model 230 generates a molding condition according to the target standard data. The molding condition generation model 230 may be trained by the molding condition output unit 220. In particular, when it is determined that the molding condition is inappropriate as a result of manufacturing the product under the molding condition output by the molding condition output unit 220, the molding condition generation model 230 according to the present disclosure may be additionally trained using the molding condition and the manufacturing standard data of the product manufactured under the inappropriate molding condition as one feedback dataset.

According to an embodiment, the molding condition generation model 230 may be a neural network that allows a molding condition to be output according to the target standard data on the basis of a plurality of weights and a plurality of biases. According to such an embodiment, the molding condition generation model 230 may be implemented using an artificial neural network (ANN) algorithm.

The determination unit 250 compares the manufacturing standard data of the product, which is manufactured under the molding condition output by the molding condition output unit 220, with the target standard data, which is extracted by the standard data extraction unit 210, and determines whether the molding condition is appropriate. Specifically, when the manufacturing standard data deviates from a predetermined reference range from the target standard data, the determination unit 250 determines that the molding condition is inappropriate. Also, when the manufacturing standard data is within the predetermined reference range from the target standard data, the determination unit 250 determines that the molding condition is appropriate.

For example, when a weight of the product included in the manufacturing standard data is measured to be 100 g, a weight of the product included in the target standard data is extracted to be 90 g, and the reference range is 5 g, the weight of the manufacturing standard data deviates from the reference range from the weight of the target standard data, and thus the determination unit 250 determines that the molding condition is inappropriate.

When the molding condition is determined to be inappropriate, the determination unit 250 transmits a stop command to the injection molding machine 100. Accordingly, the injection molding machine 100 stops producing the product. Also, when the molding condition is determined to be inappropriate, the determination unit 250 transmits a feedback training command to the molding condition output unit 220. Accordingly, the molding condition output unit 220 trains the molding condition generation model 230 using the inappropriate molding condition and the manufacturing standard data as one feedback dataset.

Meanwhile, as shown in FIG. 5, the molding condition generation device 200 according to the present disclosure may additionally include a standard data measurement unit 240 and a model generation unit 260.

The standard data measurement unit 240 measures the manufacturing standard data of the product manufactured from the injection molding machine 100. To this end, as shown in FIG. 5, the standard data measurement unit 240 includes a take-out unit 242 and a standard data generation unit 244.

The take-out unit 242 takes the manufactured product out of the mold. For example, the take-out unit 242 may be an articulated take-out robot.

The standard data generation unit 244 generates manufacturing standard data from the taken-out product. Specifically, the standard data generation unit 244 generates first shape information by photographing the product, generates first weight information by measuring a weight of the product, and generates manufacturing standard data including the first shape information and the first weight information. In this case, the standard data generation unit 244 may be implemented as a vision system (not shown) to generate the first shape information.

According to an embodiment, the first shape information of the product may include at least one of a total volume of the product, a volume of portions corresponding to cavities of the mold, the number of portions corresponding to the cavities, a surface area of the product, a first projected area XY of the product, a second projected area YZ of the product, a third projected area ZX of the product, a maximum thickness of the product, an average thickness of the product, a standard deviation of a thickness of the product, a diameter of the portions corresponding to the gates, a maximum flow distance from the portions corresponding to the gates to an end of the product, and a ratio of the average thickness of the product to the maximum flow distance.

The standard data generation unit 244 may transmit the generated manufacturing standard data to the determination unit 250.

The model generation unit 260 generates the molding condition generation model 230. Specifically, the model generation unit 260 may generate the molding condition generation model 230 by training a neural network with a plurality of training datasets.

The model generation unit 260 generates a plurality of training datasets by integrating a plurality of pre-collected training molding conditions with training standard data of a product manufactured under each of the training molding conditions. The training molding conditions may include at least one of a temperature of the mold, a temperature of the barrel 121, an injection speed of the injection molding machine 100, a packing time of the injection molding machine 100, and a packing pressure of the injection molding machine 100. The training standard data may include at least one of shape information and weight information of the product.

The model generation unit 260 generates the molding condition generation model 230 by training the neural network with the generated training datasets.

As an example, the model generation unit 260 constructs a weight prediction system by training a neural network having a predetermined layer structure with the training datasets and performs min-max normalization for converting the training datasets into the same value domain. Here, the training datasets may be classified into n-dimension input data including shape information and a molding condition and one-dimension output data including weight information of the product. n may be the number of pieces of information included in the shape information and the molding condition. For example, when the shape information includes 15 pieces of information and the molding condition includes 5 pieces of information, n is 20.

The model generation unit 260 distributes the input data and the output data for training, verification, and testing at a predetermined ratio. To increase the accuracy of the molding condition generation model 230, the model generation unit 260 extracts shape information related to the weight information of the product from the shape information and generates a product weight prediction system using the extracted shape information. According to an embodiment, the model generation unit 260 may perform sensitivity analysis to extract shape information related to the weight information of the product from the shape information.

According to an embodiment, the model generation unit 260 may perform a grid search or a random search to determine a hyperparameter of the neural network. Here, the grid search may be applied to an activation function, an optimization method, and an initialization method, and the random search may be applied to other hyperparameters.

Using the generated weight prediction system, the model generation unit 260 generates the molding condition generation model 230 that derives, when a weight is given, a molding condition corresponding to the weight in reverse. Accordingly, when shape information and weight information are input to the molding condition generation model 230, weight information corresponding to the shape information is input, and thus a molding condition corresponding to the weight information may be derived.

According to an embodiment, the model generation unit 260 may generate the molding condition generation model 230 from the weight prediction system using particle swarm optimization or random search.

The present disclosure can enable a user to find a process condition through the molding condition generation model 230 generated by the model generation unit 260 even without expert knowledge about injection molding such that dependency on experts can be reduced. Also, the molding condition generation model 230 can be improved through additional training with feedback data, and higher accuracy can be achieved. Accordingly, it is possible to construct a smart factory in the injection field on the basis of an unmanned injection molding system.

A molding condition generation method in an injection molding system according to the present disclosure will be described in detail below with reference to FIG. 6. The molding condition generation method in an injection molding system according to the present disclosure may be performed by the injection molding system shown in FIG. 1.

Figure 6:
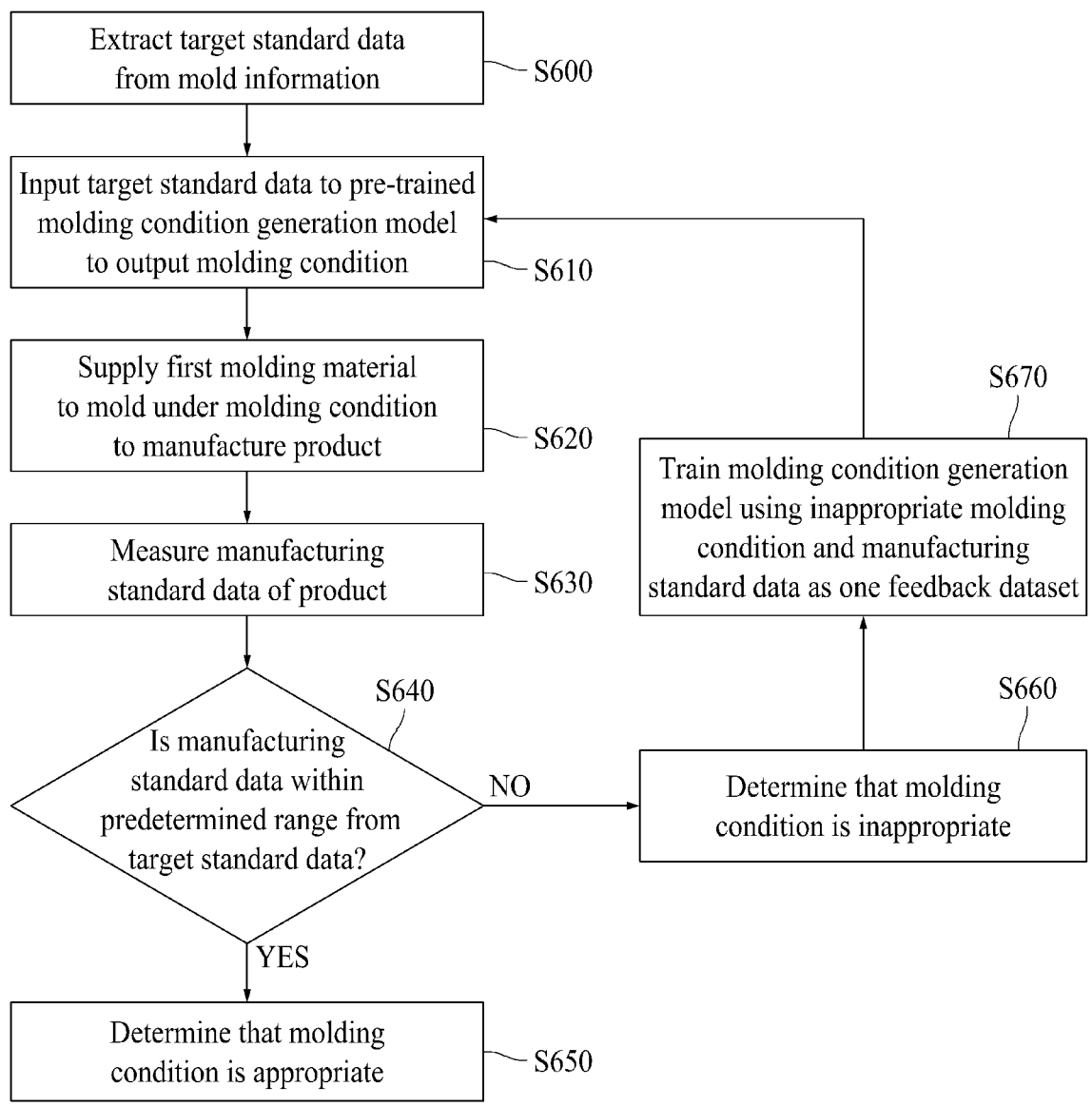
FIG. 6 is a flowchart illustrating a molding condition generation method in an injection molding system according to an embodiment of the present disclosure.

FIG. 6 is a flowchart illustrating a molding condition generation method in an injection molding system according to an embodiment of the present disclosure.

The injection molding system 10 extracts target standard data, which is a standard of a product, from mold information (S600). Specifically, the injection molding system 10 extracts target standard data of a product, which is manufactured through a mold, from mold information about the mold to which a first molding material in a melted state is supplied. The first molding material is a molding material used in the product to be manufactured.

According to an embodiment, the standard data includes at least one of shape information and weight information of the product.

According to an embodiment, the shape information of the product may include at least one of a total volume of the product manufactured through the mold, a volume of cavities of the mold, the number of cavities, the number of gates of the mold, a surface area of the product, a surface area of the cavities, a first projected area XY of the product, a second projected area YZ of the product, a third projected area ZX of the product, a maximum thickness of the product, an average thickness of the product, a standard deviation of a thickness of the product, a diameter of the gates, a maximum flow distance from the gates to an end of the product, and a ratio of the average thickness of the product to the maximum flow distance.

The first to third projected areas are areas of the product vertically projected on axial planes XY, YZ, and ZX, respectively. Also, the diameter of the gates is a circular diameter or a hydraulic diameter.

The injection molding system 10 extracts a solid density of the first molding material among a plurality of molding materials from the material property database 215. Then, the injection molding system 10 may extract a weight of the product using the extracted solid density of the first molding material and the total volume of the product.

Subsequently, the injection molding system 10 inputs the extracted target standard data into the molding condition generation model 230 trained in advance and outputs a molding condition (S610). According to an embodiment, the molding condition may include at least one of a temperature of the mold, a temperature of the barrel 121, an injection speed of the injection molding machine 100, a packing time of the injection molding machine 100, and a packing pressure of the injection molding machine 100.

Subsequently, the injection molding system 10 supplies the first molding material to the mold under the molding condition and manufactures the product (S620).

Subsequently, the injection molding system 10 measures product standard data of the manufactured product (S630).

Subsequently, the injection molding system 10 compares the measured manufacturing standard data with the target standard data and determines whether the molding condition is appropriate (S640). Specifically, when the manufacturing standard data is within a predetermined range from the target standard data, the injection molding system 10 determines that the corresponding molding condition is appropriate (S650). When the manufacturing standard data deviates from the predetermined range from the target standard data, the injection molding system 10 determines that the corresponding molding condition is inappropriate (S660).

When it is determined that the molding condition is inappropriate, the injection molding system 10 stops producing the product.

Subsequently, when it is determined that the molding condition is inappropriate, the injection molding system 10 trains the molding condition generation model 230 using the inappropriate molding condition and the manufacturing standard data as one feedback dataset (S670).

According to an embodiment, the injection molding system 10 may perform transfer learning on the molding condition generation model 230 with the feedback dataset.

Subsequently, when training of the molding condition generation model 230 with the feedback dataset is completed, the injection molding system 10 may input the target standard data to the molding condition generation model 230 to output a modified molding condition.

Those of ordinary skill in the art should understand that the present disclosure can be implemented in other specific forms without changing the technical spirit or necessary characteristics of the present disclosure.

Also, the methods described herein can be implemented at least partially using one or more computer programs or components. These components may be provided as a series of computer instructions on any computer-readable medium or machine-readable medium including a volatile or non-volatile memory. The instructions may be provided as software or firmware and may be implemented in whole or in part in hardware components such as application specific integrated circuits (ASICs), field programmable gate arrays (FPGAs), digital signal processors (DSPs), or other similar devices. The instructions may be configured to be executed by one or more processors or other hardware components, which, when executing the series of computer instructions, perform or make it possible to perform all or some of the methods and procedures disclosed herein.

Therefore, it should be understood that the above-described embodiments are illustrative in all aspects and are not limitative. The scope of the present disclosure is defined by the following claims rather than the detailed descriptions, and it should be interpreted that all changes or modifications derived from the meanings and scope of the claims and the equivalents thereto fall within the scope of the present disclosure.

The invention claimed is:

1. A molding condition generation method in an artificial intelligence (AI)-based injection molding system, the molding condition generation method comprising:
   extracting target standard data, which is a standard of a product, from mold information of a mold to which a molding material in a melted state is supplied;
   inputting the extracted target standard data into a pre-trained molding condition generation model to output a molding condition, wherein the molding condition specifies at least a temperature of a barrel used to supply the molding material into the mold,
   supplying the molding material to the mold under the molding condition to manufacture the product;
   measuring manufacturing standard data of the manufactured product;
   comparing the measured manufacturing standard data with the target standard data to determine whether the molding condition is appropriate; and
   performing, based on a determination of whether the molding condition is appropriate, one of:
      (i) when the determination is that the molding condition is appropriate, producing the manufactured product via the mold according to the molding condition determined to be appropriate; and
      (ii) when the determination is that the molding condition is not appropriate:
         stopping production of the manufactured product via the mold according to the molding condition determined to not be appropriate; and
   training the molding condition generation model using the molding condition determined to not be appropriate and the manufacturing standard data as one feedback dataset.

2. The method of claim 1, wherein training the molding condition generation model is performed via transfer learning on the molding condition generation model with the one feedback dataset.

3. The method of claim 1, wherein, when the molding condition generation model is completely trained, the target standard data is input to the molding condition generation model to output a modified molding condition.

4. The method of claim 1, wherein the molding condition generation model is configured as a neural network which allows the molding condition to be output according to the target standard data based on a plurality of weights and a plurality of biases.

5. The method of claim 1, training the molding condition generation model includes:
- integrating a plurality of training molding conditions with training standard data of a training product manufactured under each of the training molding conditions to generate a plurality of training datasets; and
- training a neural network with the plurality of training datasets to generate the molding condition generation model.

6. The method of claim 1, wherein the standard data includes at least one of shape information and weight information of the product.

7. The method of claim 6, wherein the shape information includes at least one of:
- a total volume of the product manufactured through the mold,
- a volume of cavities of the mold,
- a number of the cavities of the mold,
- a number of gates of the mold,
- a surface area of the product,
- a surface area of the cavities,
- a first projected area (XY) of the product,
- a second projected area (YZ) of the product,
- a third projected area (ZX) of the product,
- a maximum thickness of the product,
- an average thickness of the product,
- a standard deviation of a thickness of the product,
- a diameter of the gates,
- a maximum flow distance from the gates to an end of the product, and
- a ratio of the average thickness of the product to the maximum flow distance.

8. The method of claim 6, further comprising:
- extracting a solid density of the molding material from a material property database configured to store solid densities of a plurality of molding materials; and
- calculating a weight of the product using a total volume of the product and the solid density of the molding material.

9. The method of claim 1, further comprising:
- photographing a taken-out manufactured product that has been taken out of the mold in which the taken-out manufactured product was produced via an injection-molding process to generate a shape information for the taken-out manufactured product; and
- measuring a weight of the taken-out manufactured product to generate a weight information of the taken-out manufactured product;
- wherein the manufacturing standard data includes the shape information and the weight information.

10. The method of claim 1, wherein the molding condition further specifies at least one of:
- a temperature of the mold;
- an injection speed of an injection molding machine used with the mold;
- a packing time of the injection molding machine; and
- a packing pressure of the injection molding machine.

* * * * *